United States Patent
Mueller

(10) Patent No.: US 7,938,035 B2
(45) Date of Patent: May 10, 2011

(54) ACTUATING DEVICE FOR A VEHICLE TRANSMISSION

(75) Inventor: Arnold Mueller, Kirchheim (DE)

(73) Assignee: AMK Arnold Mueller GmbH & Co. KG, Kirchheim/Teck (DE)

( * ) Notice: Subject to any disclaimer, the term of this patent is extended or adjusted under 35 U.S.C. 154(b) by 994 days.

(21) Appl. No.: 11/764,841

(22) Filed: Jun. 19, 2007

(65) Prior Publication Data

US 2008/0041181 A1    Feb. 21, 2008

(30) Foreign Application Priority Data

Jun. 20, 2006   (DE) .................. 10 2006 028 270

(51) Int. Cl.
*F16H 61/28* (2006.01)
(52) U.S. Cl. ...................... 74/89.3; 74/473.12
(58) Field of Classification Search ............. 74/335, 74/473.12, 89.23, 89.29, 89.3
See application file for complete search history.

(56) References Cited

U.S. PATENT DOCUMENTS

| | | | | | |
|---|---|---|---|---|---|
| 3,407,680 A | * | 10/1968 | Westmoreland | ............... | 74/89.3 |
| 4,509,379 A | * | 4/1985 | Westmoreland | ............... | 74/58 |
| 4,532,823 A | * | 8/1985 | Razzacki | .................... | 74/473.1 |
| 4,730,503 A | * | 3/1988 | Rosenthal | ......................... | 74/58 |
| 5,647,245 A | * | 7/1997 | Takei | .............................. | 74/89.3 |
| 7,007,566 B2 | * | 3/2006 | Norum | ............................ | 74/335 |

FOREIGN PATENT DOCUMENTS

DE    39 38 353    *    5/1990

* cited by examiner

*Primary Examiner* — William C Joyce
(74) *Attorney, Agent, or Firm* — Michael J. Striker

(57) ABSTRACT

An actuating device for a transmission of a vehicle, particularly a commercial vehicle, a bus, or the like, moves a trip cam of the transmission forward or backward in the longitudinal direction, and in the transverse direction in one direction or the other transversely to the longitudinal direction. It has a spindle, which includes two axially adjacent thread sections with opposing thread directions, with a spindle nut on each thread section of the spindle, with a drive motor for each spindle nut to drive it in a rotary manner, and with a coupling member that engages with the trip cam and moves it in the longitudinal and transverse directions, and which is actuatable using the spindle.

30 Claims, 3 Drawing Sheets

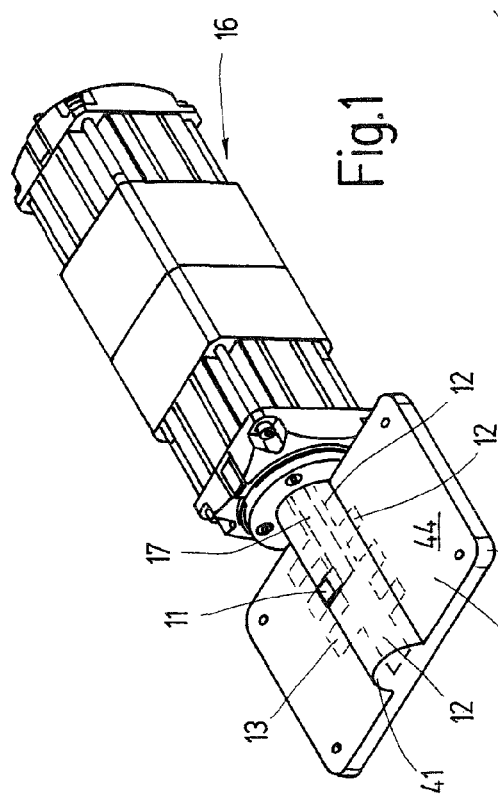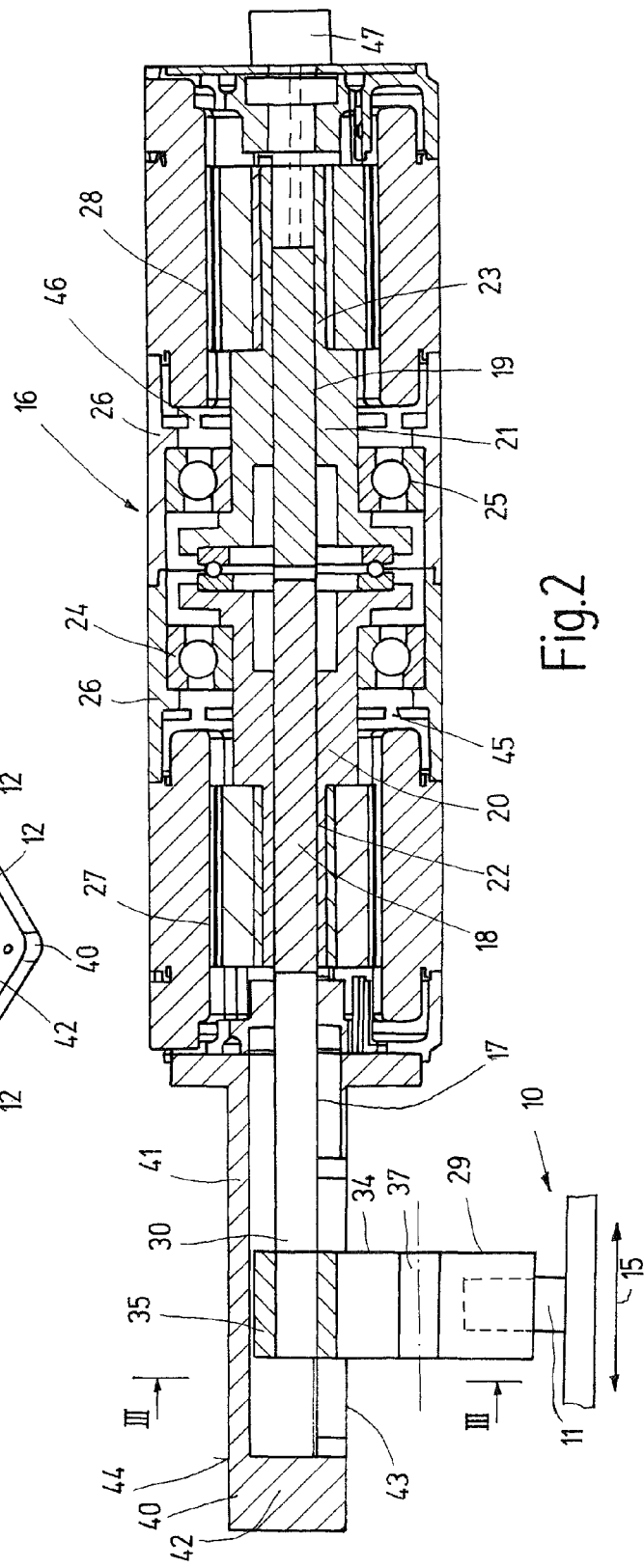

ACTUATING DEVICE FOR A VEHICLE TRANSMISSION

CROSS-REFERENCE TO A RELATED APPLICATION

The invention described and claimed hereinbelow is also described in German Patent Application DE 10 2006 028 270.1 filed on Jun. 20, 2006. This German Patent Application, whose subject matter is incorporated here by reference, provides the basis for a claim of priority of invention under 35 U.S.C. 119(a)-(d).

BACKGROUND OF THE INVENTION

The present invention relates to an actuating device for a transmission of a vehicle, particularly a commercial vehicle, a bus, or the like.

Known actuating devices of this type include a compound slide, which has a separate spindle motor for displacing the longitudinal slide in the longitudinal direction, and a further assigned spindle motor for transversely displacing the transverse slide in the transverse direction; the further assigned spindle motor is retained on the longitudinal slide together with the transverse slide, and is therefore necessarily carried along therewith. An actuating device of this type is expensive and complicated. Two absolute value sensors are required to continually display the particular position of the two spindle motors. This is also expensive. It is also disadvantageous that an actuating device of this type is large and therefore requires a great deal of installation space.

SUMMARY OF THE INVENTION

The object of the present invention is to create an actuating device of the type described initially that is simple, compact, cost-favorable, and lightweight in design, and that can be installed in tight spaces.

In keeping with these objects and with others which will become apparent hereinafter, one feature of the present invention resides, briefly stated in an actuating device for a transmission of a vehicle operative for moving a trip cam of the transmission forward and backward in a longitudinal direction, and also in a transverse direction in one direction or the other transversely to the longitudinal direction, the actuating device comprising a drive device with a spindle that includes two axially adjacent thread sections with opposing thread directions; a spindle nut provided on each of said thread sections of said spindle; a drive motor for each spindle nuts to drive a respective one of said spindle nuts in a rotary motion; and a coupling member engageable with the trip cam and moving the later in the longitudinal and transverse directions, said coupling member being actuatable using said spindle.

Due to this inventive design of the actuating device, faster working speeds can be attained for the actuating motion of a transmission trip cam. The only masses present are masses that need be accelerated and decelerated only slightly, i.e., the rotatably-drivable spindle nuts and the axial spindle. As a result, it is possible to attain much higher speeds. It is also advantageous that the actuating device is compact, lightweight, and much more cost-favorable to manufacture than known devices of this type.

For the drive, e.g., it is possible to use existing drive units, in a somewhat modular manner. It is also advantageous that there are no restrictions on the extent, e.g., of actuator travel in the longitudinal and/or transverse directions, and that it can be freely designed by programming a control device responsible for central control of the drive motors. The actuating device can therefore be adapted quickly and easily to different actuation tasks. Since the actuating device is particularly compact in design, it is also advantageously suited for installation in tight spacial conditions.

Further details and advantages of the present invention result from the description, below.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a schematic, perspective view of an actuating device for a transmission, in accordance with the present invention, FIG. 2 shows a schematic, axial longitudinal cross-section of the actuating device in FIG. 1, on a larger scale in accordance with the present invention.

DESCRIPTION OF THE PREFERRED EMBODIMENTS

Figure 3:
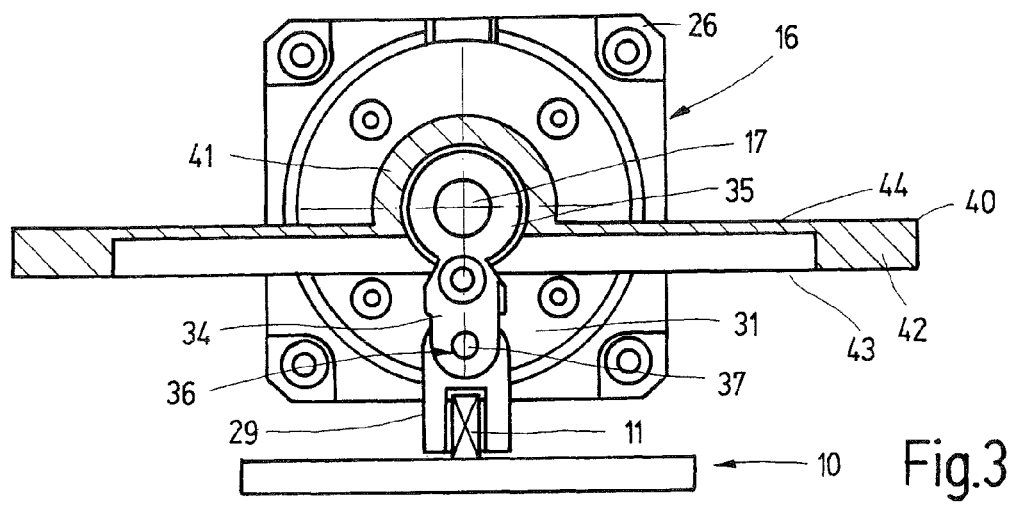
FIG. 3 shows a schematic side view with a partial cross section along the line III-III in FIG. 2, in which the actuating device is located in an intermediate stage of the displacement motion in accordance with the present invention.
Figure 4:
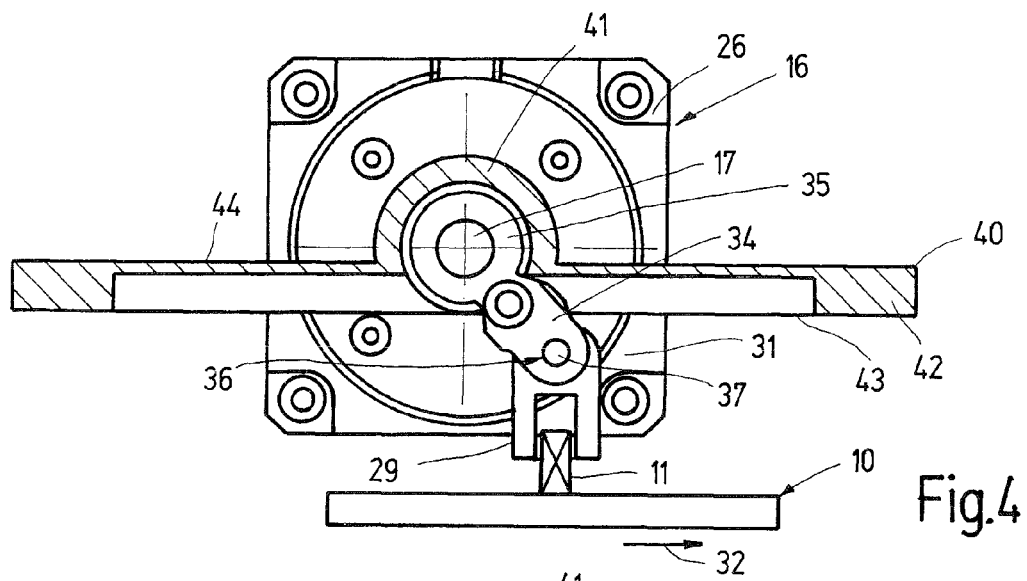
FIGS. 4 and 5 show the same view as in FIG. 3, but with the actuating device in different actuation positions in accordance with the present invention.

FIGS. 1 through 4 are schematic views of a part 10—that is interesting in this context—of a transmission of a vehicle, particularly a commercial vehicle, a bus, or the like, which includes a vertically extending trip cam 11. Trip cam 11 has the shape of an outer polyhedron, e.g., a square peg, in particular. Dashed lines are used in FIG. 1 to show that trip cam 11 is displaced within a plane with longitudinally extending shift paths 12 and transversely extending shift paths 13, in order to actuate the not-shown transmission.

In the position shown in FIG. 1, trip cam 11 is located in transversely extending shift path 13. This corresponds to a certain gearshift in a specified gear. If the gear is shifted and a different gear is selected, trip cam 11 is moved via a transverse motion out of transversely extending shift path 13 into longitudinally extending shift path 12, and is moved along the latter in the longitudinal direction forward or backward until the other, transversely extending shift path 13 assigned to the desired gear to be switched to is reached. Trip cam 11 is then moved via a transverse motion into this new, transversely extending shift path 13.

It is known to use a compound slide and spindle motors to perform these actuating motions of trip cam 11 to shift various gears of the transmission. The compound slide includes a longitudinal slide, which is guided along a guide carrier, and which can be actuated to perform the longitudinal motion using a spindle motor mounted on the guide carrier. The longitudinal slide is the carrier of a transverse slide and a spindle motor assigned to this transverse slide.

When the longitudinal slide moves longitudinally, the transverse slide and its spindle motor are carried along. The transverse slide is the carrier of a connection element, which is connected with the trip cam for shifting the transmission. An actuating device of this type, which uses compound slides and two separate spindle motors, is expensive. It requires a great deal of space and, therefore, a great deal of installation space. Two absolute value sensors are required for the actuating motions, and to signal the particular position of the two spindle motors.

In a particular design of the actuating device described for a vehicle transmission, the present invention provides a drive device 16 with a spindle therefor, which has two axially adjacent threaded sections 18 and 19 with opposing thread directions. Thread section 18 has, e.g., a left-handed thread, while thread section 19 has a right-handed thread. The thread directions can also be reversed. A spindle nut 20 is assigned to thread section 18, and a spindle nut 21 is assigned to the other thread section 19. Spindle nuts 20, 21 are provided with inner threads and are mounted on particular thread section 18 or 19. Each spindle nut 20, 21 is non-rotatably connected with a sleeve 22 or 23 that is coaxial with spindle 17, and is supported using a bearing 24 or 25 such that it can rotate relative to a housing 26.

A particular drive motor 27 or 28—which is designed as an electric motor, in particular—is assigned to each spindle nut 20, 21 to drive it in a rotating manner. Sleeve 22 or 23 can be the carrier of the rotor of drive motor 27 or 28, or it can be designed as the rotor itself. Each spindle nut 20, 21 are rotatable using assigned drive motor 27 or 28, but they are located such that they cannot be displaced axially. A rotary actuation of particular spindle nut 20 or 21 therefore results in a translation drive and/or rotary drive of spindle 17. When both drive motors 27 and 28 drive particular associated spindle nut 20, 21 in the same rotary direction and with the same rotary speed, these results in an exclusive rotary motion of spindle 17 in one direction or the other that depends on the particular direction of rotation when drive motors 27, 28 operate in a synchronized manner.

If spindle nuts 20, 21 are driven by drive motors 27 or 28 with the same rotational speed, but in opposite directions of rotation, spindle 17 is driven in a translatory manner per arrow direction 15 in one direction or the other, depending on the direction of rotation.

Drive device 16 includes a coupling member 29, which is actuatable using spindle 17, engages with trip cam 11 and moves it in the longitudinal direction according to longitudinally extending shift path 12, i.e., forward or backward, and in the transverse direction according to transversely extending shift path 13. Spindle 17 is provided with a motion converter 31 in the region of end 30 located on the left in FIG. 2. Via motion converter 31, the rotary output motion of spindle 17 in one direction of rotation or the other can be changed to a translatory transverse motion of coupling member 29 in one transverse direction or the other. Via motion converter 31, therefore, the rotary output motion of spindle 17—when it rotates in one direction—is converted to a translatory transverse motion to the right, e.g., as indicated by arrow 32 in FIG. 4.

Figure 5:
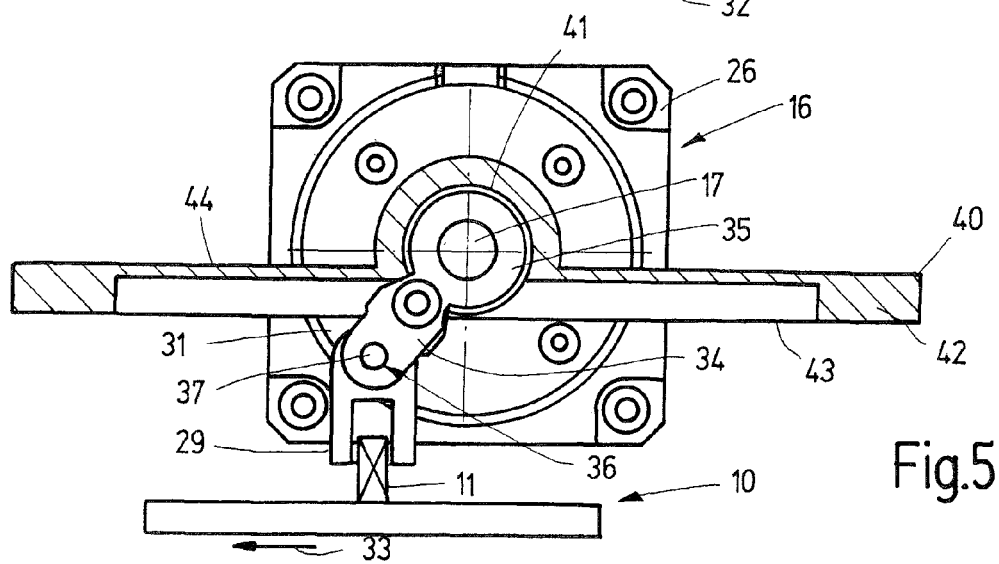

When the rotary output motion of spindle 17 is in the opposite direction, it is converted via motion converter 31 to a translatory transverse motion to the left, as indicated by arrow 33 in FIG. 5. Due to these translatory transverse motions in arrow direction 32 or 33, trip cam 11—which is actuated by coupling member 29—is therefore pushed into one of the transversely extending shift paths 13. FIG. 3 shows a position of motion converter 31 that corresponds to a motion of spindle 17 in the longitudinal direction as indicated by arrow 15. Trip cam 11 is also carried along, in a form-fit manner, via coupling member 29, and it is displaced accordingly. Motion converter 31 is therefore carried along in the longitudinal direction with spindle 17, and its longitudinal motion results in a corresponding longitudinal motion of coupling member 29 and trip cam 11.

A nearly radially oriented driving member 34—with which coupling member 29 engages—is non-rotatably connected with spindle 17 on the output side. Radially extending driving element 34 can be retained on a sleeve 35, which is fixedly connected with spindle 17. Driving member 34 and coupling member 29 are pivotably interconnected using a joint 36, e.g., a bolt 37, such that they can pivot around an axis that extends in parallel with the axis of spindle 17.

When spindle 17 makes an output pivoting motion, coupling member 29 is displaceable relative to trip cam 11 at nearly a right angle to the shift plane, while maintaining the actuating engagement with trip cam 11. This is attained by the fact that coupling member 29 is inserted onto trip cam 11—from the top down, as shown in the drawing—and a relative motion of coupling member 29 in this direction, relative to trip cam 11, is possible. Coupling member 29 can have an inner polyhedron, e.g., a square hole, which is matched to a corresponding outer polyhedron, e.g., a square peg, of trip cam 11, and it is capable of being coupled therewith in a form-fit manner by placing it thereon.

With another, not-shown exemplary embodiment of a motion converter, the driving member 34 and coupling member 29 are interconnected via a coupling, which has a longitudinal slot on one part, e.g., on coupling member 29, and a cam that engages in the longitudinal slot on another part, e.g., on driving member 34. In this case, the vertical relative motion takes place between driving member 34 and coupling member 29, and not between coupling member 29 and trip cam 11, as with the first exemplary embodiment. Particularly advantageously, spindle 17 can be designed as a recirculating ball screw, which functions in a very smooth, low-friction manner.

Drive device 16 includes—at one end of housing 26, particularly on the left end of the housing as shown in FIGS. 1 and 2—a nearly cover-like fastening part 40 that engages with housing 26 nearly on the end face and which is fixedly connected with drive device 16. With this fastening part 40, drive device 16 can be placed onto not-shown transmission housing from the top, and it is detachably connectable thereto. Spindle 17 extends further into fastening part 40. Motion converter 31 is located in fastening part 40, and radial driving member 34 and coupling member 29 extend out of fastening part 40 downward, into the drawing.

Fastening part 40 includes a tube part 41, which extends as an extension of spindle 17 and nearly coaxial with its longitudinal central axis, in which spindle 17 with sleeve 35 is guided; sleeve 35 carries driving member 34. Tube part 41 of fastening part 40 extends around a circumferential angle that is greater than 180° and less than 360°, such that sleeve 35 with spindle 17 is enclosed by tube part 41 around a circumferential angle greater than 180° and is secured against slipping downward, as indicated in FIGS. 3 and 5. In this manner, tube part 41 forms a longitudinal guide with a bearing property transverse to the longitudinal central axis of spindle 17, and permits driving member 34 to perform a pivoting motion to either side.

Fastening part 40 is designed as a hollow plate 42, which is open on a broadside 43 that extends downward as shown in FIGS. 2 and 5, and includes tube part 41 in the region of opposing other broadside 44.

Drive device 16 is provided with a not-shown control device, by way of which drive motors 27, 28 are controlled in terms of their rotational speed, direction of rotation, and/or their drive torque. FIG. 2 shows schematically that a rotative sensor 45 or 46 is assigned to drive motor 27 and drive motor 28, via which the revolutions of assigned spindle nut 20 or 21 are sensed. Furthermore, an absolute value linear sensor 47—which is also depicted schematically—for the longitudinal motion of the spindle, is assigned to spindle 17.

Sensors 45 through 47 are connected with the not-shown control device in order to regulate the operation of drive device 16, thereby enabling the particular output signals of sensors 45 through 47 to be sent to the control device. The output signals can be compared with setpoint values in a not-shown controller. Using the controller, electrical actuating signals for actuating drive motors 27 and 28 are generated, in order to bring about the specified shift position of trip cam 11 by controlling drive motors 27, 28 accordingly.

Figure 6:
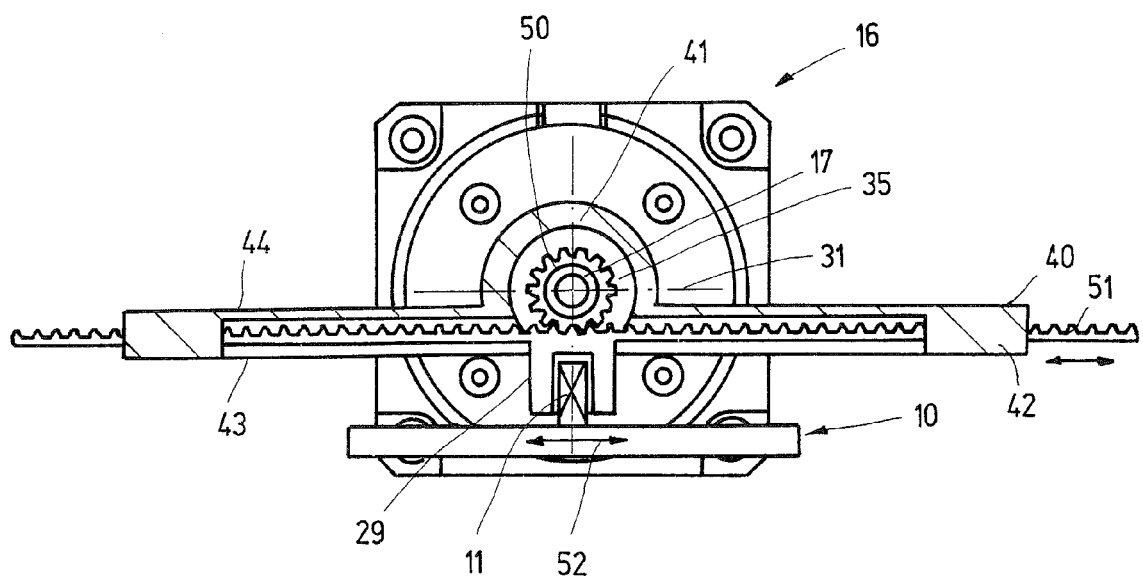
FIG. 6 is a schematic, partially exposed side view, which nearly corresponds to the view in FIG. 3, of an actuating device according to a second exemplary embodiment in accordance with the present invention.

With the second exemplary embodiment, shown in FIG. 6, the same reference numerals are used for the components that correspond to the first exemplary embodiment, shown in FIGS. 1 through 5. To avoid repetition, reference is hereby made to the description of the first exemplary embodiment.

Motion converter 31 shown in FIG. 6 includes an output wheel 50, a gear in particular, which is non-rotatably connected with spindle 17 on the output side. A rod 51, particularly a rack, which is oriented transversely to the longitudinal central axis of spindle 17, is also provided. Output wheel 50 is in transmission engagement with rod 51. Output wheel 50 and rod 51, a rack in particular, engaged therewith are carried along with spindle 17 in the longitudinal direction, as indicated by arrow 15. Coupling member 29 is attached to rod 51, particularly a rack, e.g., as one piece. When spindle 17 pivots in one direction of rotation or the other, output wheel 50 also pivots, thereby displacing rod 51, a rack in particular, to the left or right, in the direction of arrow 52. This results in a corresponding displacement of coupling member 29 and, therefore, trip cam 11.

The description above applies for the rest of the second exemplary embodiment shown in FIG. 6.

Drive device 16 is simple and compact. It requires few components. The amount of installation space it requires is small. Drive device 16 can be placed on a transmission from the top. It is also advantageous that individual drive motors 27 and 28 of drive device 16 can be built smaller, more light-weight, and more cost-favorable than is the case with drive devices with compound slides and two separate spindle motors, with which the entire actuating force must be applied by the particular spindle motor. In comparison, drive device 16 makes it possible for the force of both drive motors 27, 28 to be added when a particular motion is carried out. Drive device 16 is also particularly easily accessible by a control or regulating device.

Trip cam 11 is easily displaced in the longitudinal and transverse directions, practically without the use of any moving drive parts. It is also advantageous that, via absolute value linear sensor 47 in conjunction with the two other rotative sensors 45 and 46, the particular position of trip cam 11 is expressed as an absolute value, so that, if there would be a power failure and the power would then be restored, the particular gearshift would still be shown in the display. It is clear that the drive with spindle nuts 20, 21 and assigned drive motors 27 and 28 provided for the translation drive and the rotary drive, both of which act on spindle 17, can be realized in a simple, cost-favorable and high-volume manner. It is only necessary to accelerate or decelerate small masses, which makes it possible to also attain high displacement speeds for trip cam 11 and, therefore, high shift speeds.

It is also advantageous that any displacement length can be chosen for the longitudinal motion and any pivot angle can be chosen for the rotary drive for the motion in the transverse direction, depending on which paths are desired to displace trip cam 11. The motions in the longitudinal direction and/or transverse direction can be adjusted quickly and easily simply by programming and reprogramming the not-shown control device accordingly.

It will be understood that each of the elements described above, or two or more together, may also find a useful application in other types of constructions differing from the type described above.

While the invention has been illustrated and described as embodied in an actuating device for a vehicle transmission, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An actuating device for a transmission of a vehicle operative for moving a trip cam of the transmission forward and backward in a longitudinal direction, and also in a transverse direction in one direction or the other transversely to the longitudinal direction, the actuating device comprising a drive device with a spindle that includes two axially adjacent thread sections with opposing thread directions; a spindle nut provided on each of said thread sections of said spindle; a drive motor for each spindle nuts to drive a respective one of said spindle nuts in a rotary motion; and a coupling member engageable with the trip cam and moving the later in the longitudinal and transverse directions, said coupling member being actuatable using said spindle, wherein said spindle has an output side and is provided on said output side with a motion convertor which converts a rotary output motion of said spindle, in one direction of rotation or in the other, into a translatory transverse motion of said coupling member in one transverse direction or the other, wherein said motion convertor is carried in the longitudinal direction with said spindle, and a longitudinal motion of said spindle results in a corresponding longitudinal motion of said coupling member.

2. An actuating device as defined in claim 1, further comprising a substantially radially oriented driving member, with which said coupling member engages and which is non-rotatably connected with said spindle on an output side.

3. An actuating device as defined in claim 2, further comprising a joint which pivotally connects said driving member and said coupling member, and said coupling member is displaceable relative to the trip cam at substantially a right angle to a shift plane, while an actuating engagement is maintained.

4. An actuating device as defined in claim 1, wherein said coupling member has an inner polyhedron which is matchable to a corresponding outer polyhedron of the trip cam and coupleable therewith in a form-fit manner by placing said coupling member on the trip cam or vice versa.

5. An actuating device as defined in claim 1, wherein said spindle is configured as a recirculating ball screw.

6. An actuating device as defined in claim 1, wherein said drive device has a housing and is provided in at least one end of said housing with substantially a fastening part formed as a cover, with which said drive device is mountable on a transmission housing.

7. An actuating device as defined in claim 6, wherein said spindle extends into said fastening part.

8. An actuating device as defined in claim 6, wherein said spindle is provided with a motion converter for converting a rotary output motion of said spindle into a translatory transverse motion of said coupling member and located in said fastening part, wherein said motion converter is located in said fastening part.

9. An actuating device as defined in claim 6, further comprising a substantially radially oriented driving member with which said coupling member engages and which is non-rotatably connected with said spindle, wherein said substantially radially oriented driving member and said coupling member extend out of said fastening part.

10. An actuating device as defined in claim 6, further comprising a substantially radially oriented driving member with which said coupling member engages and which is non-rotatably connected with said spindle, wherein said substantially radially oriented driving member is retained on a sleeve which is fixedly connected on said spindle, and said spindle is guided with said sleeve in said fastening part.

11. An actuating device as defined in claim 10, wherein said fastening part has a tube part, in which said spindle is guided with said sleeve.

12. An actuating device as defined in claim 6, wherein said fastening part is configured as a hollow plate which is open on one broad side and includes a tube part in a region of another broad side.

13. An actuating device as defined in claim 1, further comprising a control device which controls said drive motors in terms selected from the group consisting of their rotational speed, their direction of rotation, their drive torque, and combinations thereof.

14. An actuating device as defined in claim 13, further comprising sensors selected from the group consisting of rotary sensors assigned to drive motors, linear sensors assigned to said spindle, and both, wherein at least one of said sensors is connected with said control device, and output signals from at least one of said sensors are sent to said control device.

15. An actuating device as defined in claim 1, further comprising a rotary sensor assigned to each of said drive motors.

16. An actuating device as defined in claim 1, further comprising an absolute value linear sensor for a longitudinal motion of said spindle, wherein said absolute value linear sensor is assigned to said spindle.

17. An actuating device for a transmission of a vehicle operative for moving a trip cam of the transmission forward and backward in a longitudinal direction, and also in a transverse direction in one direction or the other transversely to the longitudinal direction, the actuating device comprising a drive device with a spindle that includes two axially adjacent thread sections with opposing thread directions; a spindle nut provided on each of said thread sections of said spindle; a drive motor for each spindle nuts to drive a respective one of said spindle nuts in a rotary motion; and a coupling member engageable with the trip cam and moving the later in the longitudinal and transverse directions, said coupling member being actuatable using said spindle; a substantially radially oriented driving member, with which said coupling member engages and which is non-rotatably connected with said spindle on an output side; and a coupling which interconnects said driving member and said coupling member and has one part provided with a longitudinal slot and another part provided with a cam that engages in said longitudinal slot.

18. An actuating device for a transmission of a vehicle operative for moving a trip cam of the transmission forward and backward in a longitudinal direction, and also in a transverse direction in one direction or the other transversely to the longitudinal direction, the actuating device comprising a drive device with a spindle that includes two axially adjacent thread sections with opposing thread directions; a spindle nut provided on each of said thread sections of said spindle; a drive motor for each spindle nuts to drive a respective one of said spindle nuts in a rotary motion; and a coupling member engageable with the trip cam and moving the later in the longitudinal and transverse directions, said coupling member being actuatable using said spindle; a substantially radially oriented driving member, with which said coupling member engages and which is non-rotatably connected with said spindle on an output side; and a joint which pivotally connects said driving member and said coupling member, and said coupling member is displaceable relative to the trip cam at substantially a right angle to a shift plane, while an actuating engagement is maintained.

19. An actuating device as defined in claim 18, further comprising a coupling which interconnects said driving member and said coupling member and has one part provided with a longitudinal slot and another part provided with a cam that engages in said longitudinal slot.

20. An actuating device as defined in claim 18, wherein said joint which pivotally connects said driving member and said coupling member is configured as a bolt.

21. An actuating device for a transmission of a vehicle operative for moving a trip cam of the transmission forward and backward in a longitudinal direction, and also in a transverse direction in one direction or the other transversely to the longitudinal direction, the actuating device comprising a drive device with a spindle that includes two axially adjacent thread sections with opposing thread directions; a spindle nut provided on each of said thread sections of said spindle; a drive motor for each spindle nuts to drive a respective one of said spindle nuts in a rotary motion; and a coupling member engageable with the trip cam and moving the later in the longitudinal and transverse directions, said coupling member being actuatable using said spindle, wherein said coupling member has an inner polyhedron which is matchable to a corresponding outer polyhedron of the trip cam and coupleable therewith in a form-fit manner by placing said coupling member on the trip cam or vice versa.

22. An actuating device as defined in claim 21, wherein said inner polyhedron of said coupling member is a square hole which matches to said outer polyhedron of the trip cam formed as a square peg.

23. An actuating device as defined in claim 21, wherein said spindle has an output side and is provided on said output side with a motion convertor which converts a rotary output motion of said spindle, in one direction of rotation or in the other, into a translatory transverse motion of said coupling member in one transverse direction or the other, wherein said motion converter includes an output wheel which is non-rotatably connected with said spindle on an output side, and a rod oriented transversely to said spindle and with which said output wheel is in a transmission engagement.

24. An actuating device as defined in claim 23, wherein said output wheel is configured as an output gear, and said rod is configured as a rack.

25. An actuating device as defined in claim 23, wherein said output wheel and said rod engaged therewith are carried along in the longitudinal direction with said spindle.

26. An actuating device as defined in claim 23, wherein said coupling member is mounted on said rod.

27. An actuating device as defined in claim 26, wherein said coupling member is mounted on said rod integrally, and said rod is configured as a rack.

28. An actuating device for a transmission of a vehicle operative for moving a trip cam of the transmission forward and backward in a longitudinal direction, and also in a transverse direction in one direction or the other transversely to the longitudinal direction, the actuating device comprising a drive device with a spindle that includes two axially adjacent thread sections with opposing thread directions; a spindle nut provided on each of said thread sections of said spindle; a drive motor for each spindle nuts to drive a respective one of said spindle nuts in a rotary motion; and a coupling member engageable with the trip cam and moving the later in the longitudinal and transverse directions, said coupling member being actuatable using said spindle, wherein said drive device has a housing and is provided in at least one end of said housing with substantially a fastening part formed as a cover, with which said drive device is mountable on a transmission housing, wherein said fastening part is configured as a hollow plate which is open on one broad side and includes a tube part in a region of another broad side.

29. An actuating device for a transmission of a vehicle operative for moving a trip cam of the transmission forward and backward in a longitudinal direction, and also in a transverse direction in one direction or the other transversely to the longitudinal direction, the actuating device comprising a drive device with a spindle that includes two axially adjacent thread sections with opposing thread directions; a spindle nut provided on each of said thread sections of said spindle; a drive motor for each spindle nuts to drive a respective one of said spindle nuts in a rotary motion; and a coupling member engageable with the trip cam and moving the later in the longitudinal and transverse directions, said coupling member being actuatable using said spindle, wherein said drive device has a housing and is provided in at least one end of said housing with substantially a fastening part formed as a cover, with which said drive device is mountable on a transmission housing; a substantially radially oriented driving member with which said coupling member engages and which is non-rotatably connected with said spindle, wherein said substantially radially oriented driving member is retained on a sleeve which is fixedly connected on said spindle, and said spindle is guided with said sleeve in said fastening part, wherein said fastening part has a tube part, in which said spindle is guided with said sleeve.

30. An actuating device as defined in claim 29, wherein said tube part of said fastening part extends around a circumferential angle that is greater than 180° and less than 360°.

* * * * *